(12) United States Patent
Lee et al.

(10) Patent No.: US 8,136,443 B2
(45) Date of Patent: Mar. 20, 2012

(54) SHAPING APPARATUS FOR FRUITS AND ROOT AND TUBEROUS VEGETABLES

(76) Inventors: Bong-Gu Lee, Seoul (KR); Sung-Wook Choi, Seoul (KR); Zoong-Ho Park, Gongju-Si (KR); Jun-Mo Yoo, Seoul (KR); Chang-Ho Kim, Seoul (KR); Kwang-Su Kim, Pusan (KR); Jae-Hong Kim, Seoul (KR)

( * ) Notice: Subject to any disclaimer, the term of this patent is extended or adjusted under 35 U.S.C. 154(b) by 859 days.

(21) Appl. No.: 12/138,332

(22) Filed: Jun. 12, 2008

(65) Prior Publication Data
US 2008/0307980 A1    Dec. 18, 2008

(30) Foreign Application Priority Data
Jun. 13, 2007 (KR) .................. 10-2007-0057618

(51) Int. Cl.
*A47J 17/02* (2006.01)
*B26D 7/00* (2006.01)

(52) U.S. Cl. ............... 99/539; 99/540; 99/541; 99/588; 99/590; 83/859

(58) Field of Classification Search ............. 83/7.3–7.4, 83/7.7, 7.8, 422, 431, 435.12, 435.15, 437.7, 83/441.1, 717, 657, 856, 858, 932; 30/278, 30/279.6, 280, 283, 286, 287, 289, 290, 291; 99/537, 372–384
See application file for complete search history.

(56) References Cited

U.S. PATENT DOCUMENTS

| 4,134,205 A | * | 1/1979 | Heling | 30/287 |
| 4,738,195 A | * | 4/1988 | Berube et al. | 99/591 |
| 5,216,031 A | * | 6/1993 | Dobson et al. | 99/538 |
| 2007/0144326 A1 | * | 6/2007 | de Buyer | 83/865 |

FOREIGN PATENT DOCUMENTS

| KR | 1990-0001322 | 2/1990 |
| KR | 20-0194694 | 6/2000 |
| KR | 2001-0090099 | 10/2001 |
| WO | WO 02068159 A1 * | 9/2002 |

* cited by examiner

Primary Examiner — Henry Yuen
Assistant Examiner — Jianying Atkisson
(74) Attorney, Agent, or Firm — Bryan Cave LLP (57) ABSTRACT

An apparatus is disclosed which can shape fruits and root and tuberous vegetables. The shaping apparatus is operated in such a manner that: when root and tuberous vegetable or fruit is placed in a cutting blade case and rotated, the object is spirally tracked and the spirally tracked object is removed from the lower side of the cutting blade case, so that the spirally tracked object is picked up by an additional stick and then ornamented into various forms. The shaping apparatus allows fruits and root and tuberous vegetables to be easily treated in a variety of ways, as per the second process, thereby enhancing the product value of processed foodstuffs produced from the first process.

2 Claims, 7 Drawing Sheets

SHAPING APPARATUS FOR FRUITS AND ROOT AND TUBEROUS VEGETABLES

BACKGROUND OF THE INVENTION

1. Field of the Invention

The present invention relates to kitchen appliances. More particularly, this invention relates to an apparatus that can shape fruits and root and tuberous vegetables, such as potatoes etc., into a certain shape. The shaping apparatus for fruits and root and tuberous vegetables is operated in such a manner that: when root and tuberous vegetable or fruit (an object) is placed in a cutting blade case and rotated, the object is spirally tracked and the spirally tracked object is removed from the lower side of the cutting blade case, so that the spirally tracked object is picked up by an additional stick and then ornamented into various forms. The shaping apparatus allows fruits and root and tuberous vegetables to be easily treated in a variety of ways, as per the second process, thereby enhancing the product value of processed foodstuffs produced from the first process.

2. Description of the Related Art

In general, processing methods for fruits of a certain size, such as apples, pears, etc. or root and tuberous vegetables, such as potatoes, carrots, etc., are substantially limited. That is, it is difficult to apply a second process to these fruits and vegetables. Therefore, these fruits and vegetables are converted to processed foodstuffs via a simple cooking method and then supplied to consumers.

In order to process the fruits and root and tuberous vegetables in a two-staged process and provide processed foodstuffs which appeal to consumers, the second process must be manually performed. Therefore, the conventional apparatus and method increases the manufacturing costs of the processed foodstuffs and introduces hygiene issues. That is, the conventional apparatus and method have difficulty processing fruits and root and tuberous vegetables in order to appeal to consumers and increase their product value.

SUMMARY OF THE INVENTION

The present invention solves the above problems, and provides a shaping apparatus for fruits and root and tuberous vegetables that can process fruits and tuberous vegetables to appeal to consumers and thus increase their product value, thereby easily enabling the second process to be performed.

The present invention further provides a shaping apparatus for fruits and root and tuberous vegetables that can be operated in such a way that: when a root and tuberous vegetable or fruit (an object) is placed in a cutting blade case and rotated, the object is spirally tracked and the tracked object is removed from the lower side of the cutting blade case, so that the spirally tracked object is changed in a variety of ways as both of its ends are pulled.

The present invention further provides a shaping apparatus for fruits and root and tuberous vegetables that allows fruits and root and tuberous vegetables to be easily treated in a variety of ways, as per the second process, thereby enhancing the product value of the processed foodstuffs produced from the objects obtained after the first process.

In accordance with an exemplary embodiment of the present invention, the present invention provides a shaping apparatus for root and tuberous vegetables and fruits including: a body shaped as a sleeve form, wherein a plurality of fitting grooves and locking projections are formed at the inner wall of the body and a coil spring is supported by a supporter projection formed at the lower portion of the body and placed in the body; a cutting blade case shaped as a cylindrical form, wherein a plurality of fitting protrusions corresponding to the fitting grooves are formed at the outer surface thereof, a through-hole is formed at the center of a base plate inside the cutting blade case, a cutting blade having a step is formed at a half of the base plate and is fitted coupled to the coil spring of the body; and an operation cover having a plate body, an operation handle at the upper outer surface of the plate body, and a plurality of locking protrusions at the inside of the periphery of the plate body. Here, the operation handle is connected to an operation bar that is formed at the inner surface of the plate body, in which the operation bar has a certain length at the end of which a plurality of fixing protrusions are formed and a fixing pin shaped as a pin is extended to a predetermined distance; and the plurality of locking protrusions are coupled to the locking projection.

BRIEF DESCRIPTION OF THE DRAWINGS

The features and advantages of the present invention will be more apparent from the following detailed description in conjunction with the accompanying drawings, in which.

BRIEF DESCRIPTION OF SYMBOLS IN THE DRAWINGS

1: body
2: cutting blade case
3: operation cover
4: case
5: stick
11: support projection
12: fitting groove
13: locking projection
14: coil spring
21: fitting protrusion
22: base plate
22a: cutting blade
22b: through-hole
31: operation bar
31a: fixing protrusion
31b: fixing pin
32: operation handle
33: locking protrusion

DETAILED DESCRIPTION OF EXEMPLARY EMBODIMENTS

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

Figure 1:
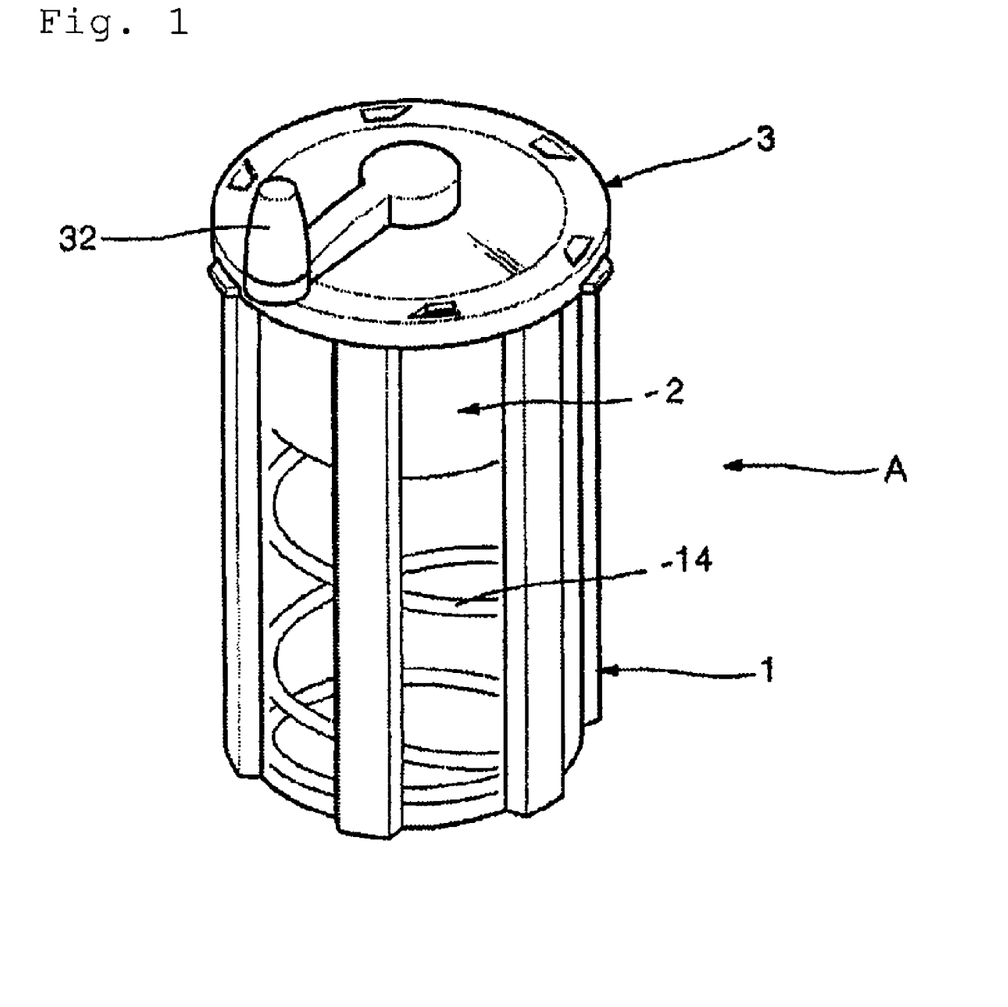
FIG. 1 is a perspective view depicting a shaping apparatus for fruits and root and tuberous vegetables, according to the present invention.
Figure 2:
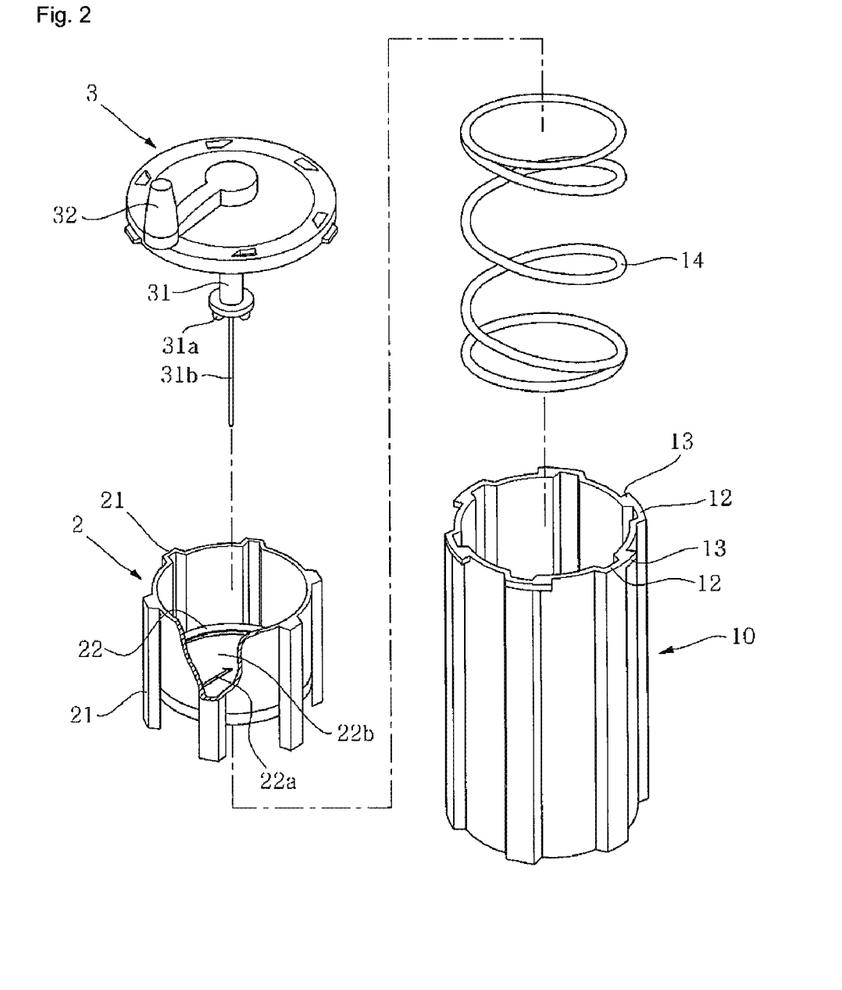
FIG. 2 is an exploded perspective view illustrating the shaping apparatus for fruits and root and tuberous vegetables, according to the present invention.
Figure 3:
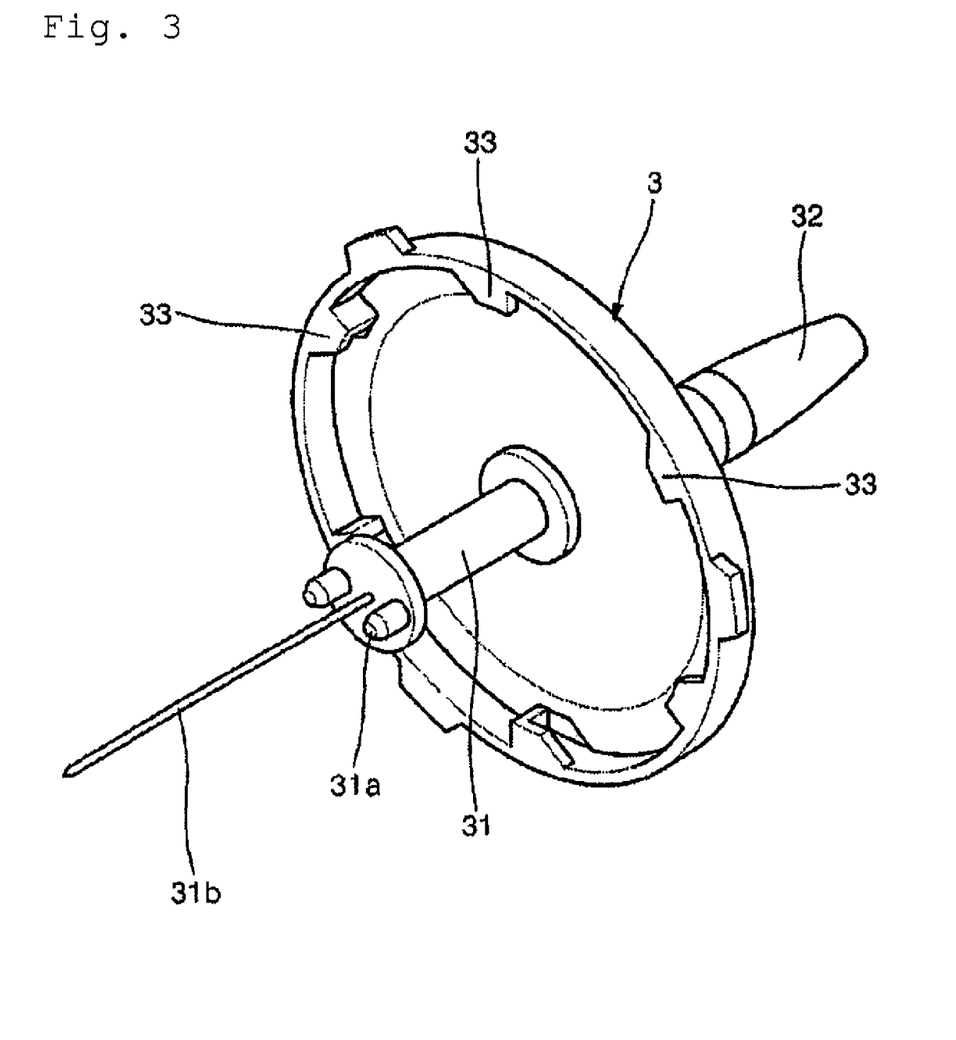
FIG. 3 is a detailed view illustrating a shaping cover included in the shaping apparatus according to the present invention.

FIG. 1 is a perspective view depicting a shaping apparatus for fruits and root and tuberous vegetables, according to the present invention. FIG. 2 is an exploded perspective view illustrating the shaping apparatus for fruits and root and tuberous vegetables, according to the present invention. FIG. 3 is a detailed view illustrating a shaping cover included in the shaping apparatus according to the present invention.

As shown in FIG. 1 to FIG. 3, the shaping apparatus A for fruits and root and tuberous vegetables includes a body 1, cutting blade case 2, and operation cover 3.

The body 1 is shaped as a sleeve form. The body 1 is configured in such a way that: a plurality of fitting grooves 12 is formed at the inner wall of the body 1; locking projections 13 are each formed at one side of the respective fitting grooves 12; and a coil spring 14 is supported by a supporter projection 11 formed at the lower portion of the body 1 and placed in the body 1.

The cutting blade case 2 shaped as a cylindrical form. The cutting blade case 2 is configured in such a way that: a plurality of fitting protrusions 21 corresponding to the fitting grooves 12 is formed at the outer surface thereof; a base plate 22 is placed therein. The base plate 22 forms a through-hole 22 band a cutting blade 22a that forms a cutting track on the object placed in the cutting blade case 2 while it is rotated.

The operation cover 3 covers the upper opening of the body 1. The operation cover 3 has a plate body, an operation bar 31 orthogonally protruded with a certain length at the center of the body plate, an operation handle 32 exposed at the upper outer surface of the plate body and rotated, and a plurality of locking protrusions 33 at the inside of the periphery of the plate body. The operation handle 32 is connected to the operation bar 31 that is formed at the inner surface of the plate body. The operation bar 31 has a plurality of fixing protrusions 31a at the end thereof, which keeps and fixes an object placed in the cutting blade case 2. The operation bar 31 has also a fixing pin 31b between the plurality of fixing protrusions 31a, in which the fixing pin 31b is extended to a predetermined distance to pin the object. The plurality of locking protrusions 33 are coupled to the locking projection 13.

Installation and operation methods of the shaping apparatus for fruits and root and tuberous vegetables are in detail described with reference to the drawings below.

Figure 4A:
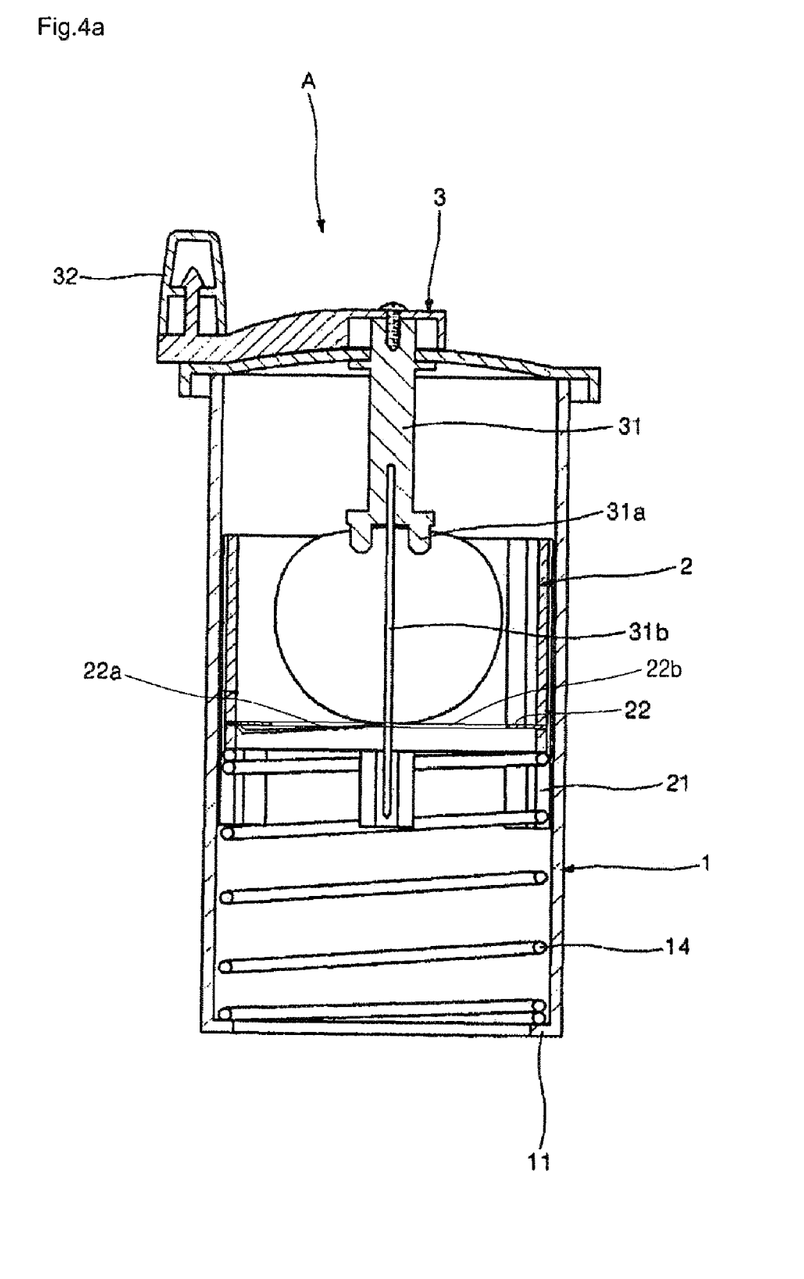
FIG. 4A and FIG. 4B are views that describe operations of the shaping apparatus according to the present invention.
Figure 4B:
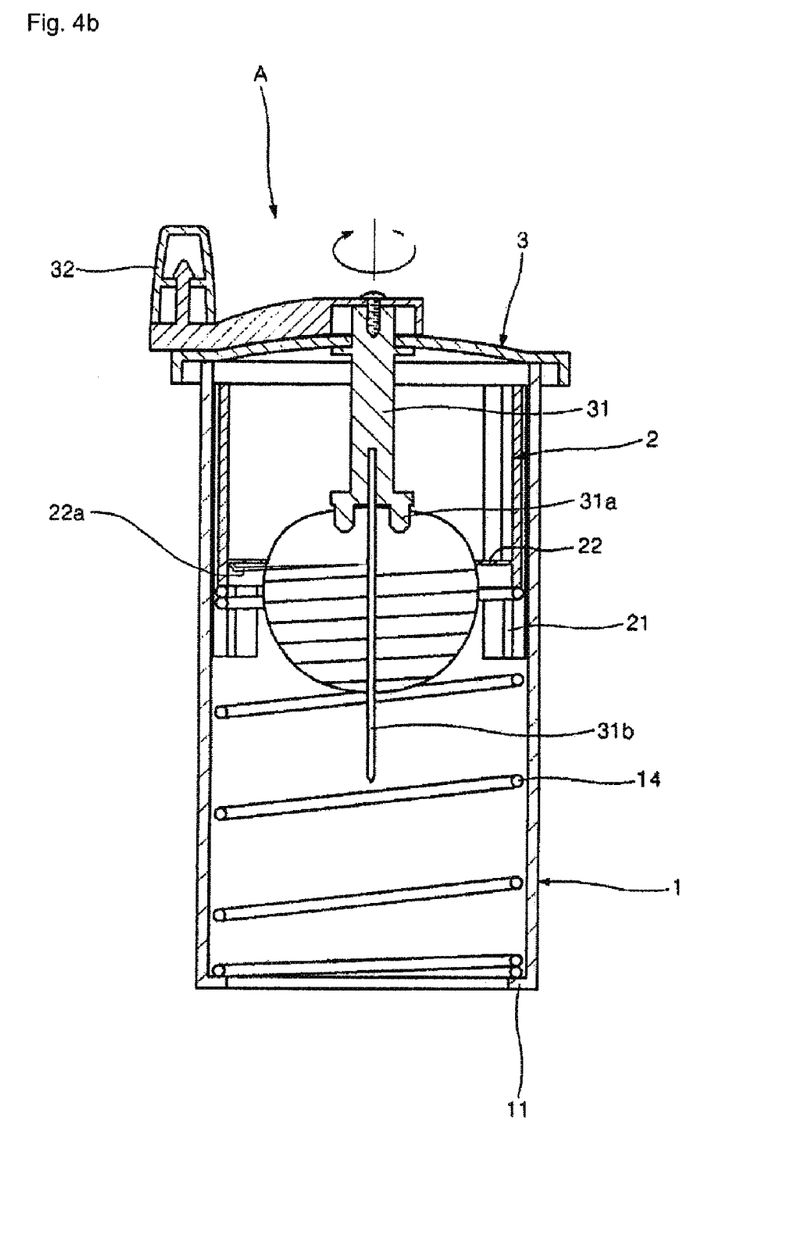
Figure 5:
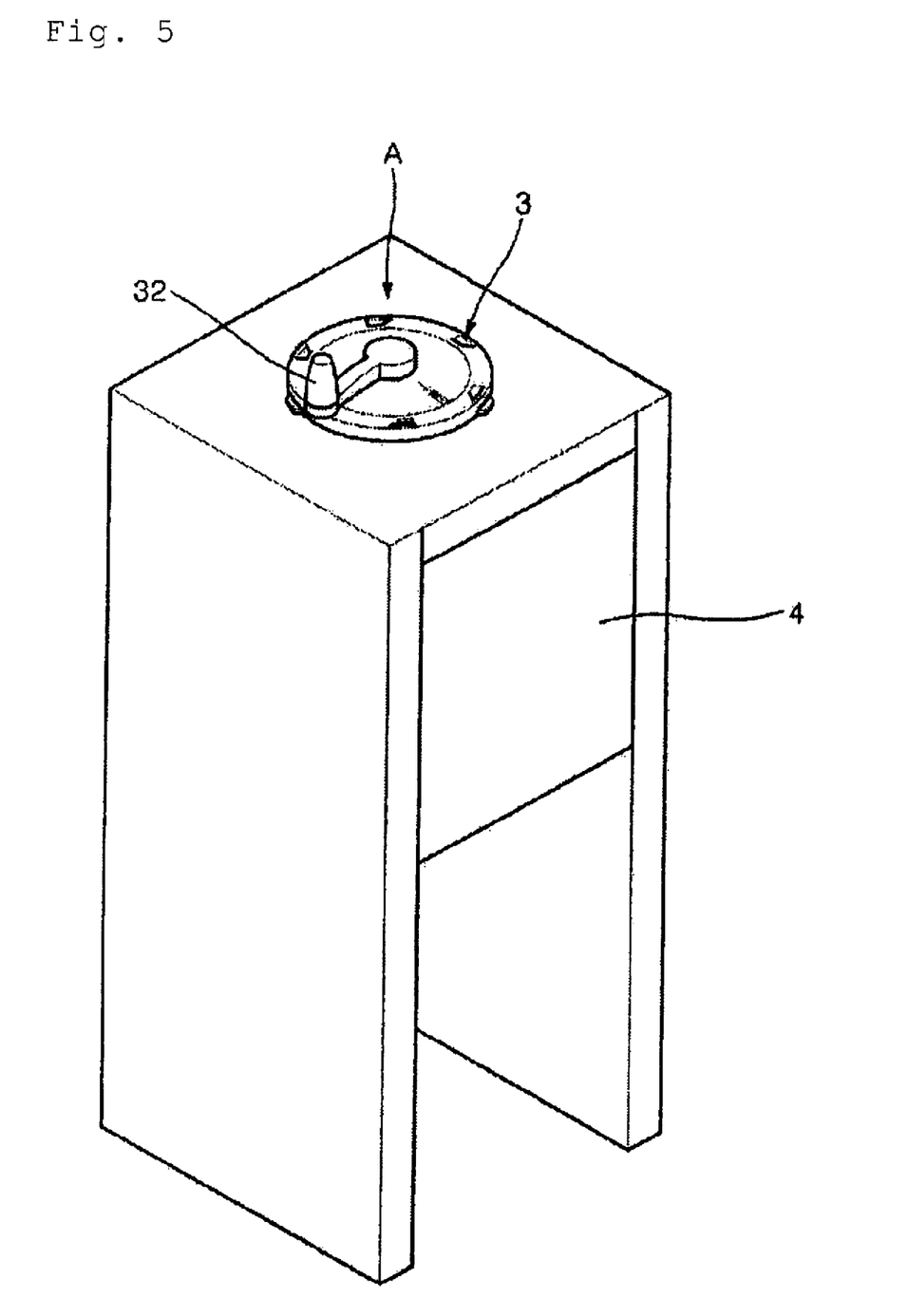
FIG. 5 is a view that describes an installation state of the shaping apparatus for fruits and root and tuberous vegetables according to the present invention.
Figure 6:
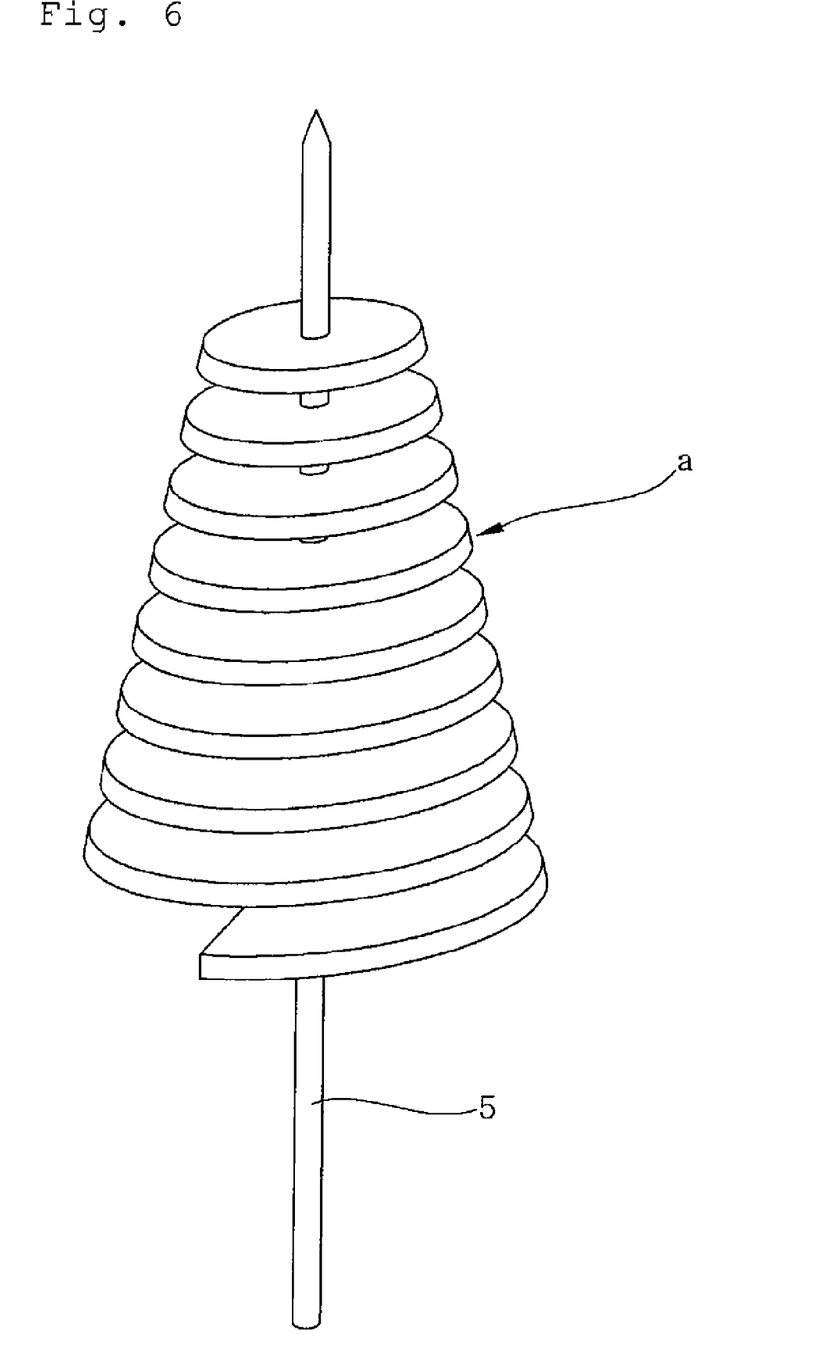
FIG. 6 is a view illustrating an object shaped by the shaping apparatus according to the present invention.

FIG. 4A and FIG. 4B are views that describe operations of the shaping apparatus according to the present invention. FIG. 5 is a view that describes an installation state of the shaping apparatus for fruits and root and tuberous vegetables according to the present invention. FIG. 6 is a view illustrating an object shaped by the shaping apparatus according to the present invention.

The shaping apparatus A for fruits and root and tuberous vegetables, according to the present invention, is installed to a case 4, as shown in FIG. 4. After the operation cover 3 is opened, the fixing pin 31b of the operation cover 3 penetrates the object and the fixing protrusions 31a of the operation bar 31 stick the upper portion of the object as shown in FIG. 4A. When the end of the fixing pin 31b penetrating the object is inserted into the through-hole 22b formed at the base plate 22 of the cutting blade case 2, the operation cover 3 is coupled to the body again, so that the object can be placed in the cutting blade case 2. The object is ready to be processed in the shaping apparatus A.

When the handle 32 exposed at the outer surface of the operation cover 3 is rotated at a low speed, the rotation force is transmitted to the object placed in the cutting blade case 2 through the fixing protrusions 31a and fixing pin 31b of the operation bar 31, so that the object is rotated while closely contacting the base plate 22 of the cutting blade case 2.

When the object is rotated in the cutting blade case 2, the cutting blade 22a is spirally lifted upward from the bottom side because the cutting blade case 2 is elastically supported upward by the coil spring 14 placed within the body 1. Therefore, a cutting track is spirally formed on the object by the cutting blade 22a.

The cutting blade 22a is configured to be stepped at a certain distance, in which the step difference can be adjusted to regulate the blade track distance on the object.

When the spiral blade track is formed over the whole body of the object, the object is removed from the lower side of the body 1 of the shaping apparatus A to the outside of the case 4. After that, a stick 5 is pinned on the center of the processed object and then both ends of the processed object are pulled, so that a processed foodstuff is produced, as shown in FIG. 6.

The shaping apparatus, according to an embodiment of the present invention, processes fruits and root and tuberous vegetables, such as potatoes, sweet potatoes, cucumbers, carrots, apples, pears, kiwi fruits, and pineapples, etc., however, it should be understood that the present invention can be applied to other processed foodstuffs, such as sausages, boiled fish sausages, etc.

It should be easily appreciated by those skilled in the art that the case 4, to which the shaping apparatus A of the present invention is installed, can be modified in such a way to alter its shape or size, thereby producing a different form from the present embodiment.

The embodiment of the present invention is implemented in such a way that fitting grooves are formed on the inner wall of the body 1 and fitting protrusions are formed on the outer wall of the cutting blade case 2, so that the cutting blade case 2 is coupled to the body 1, however, it should be understood that it can be modified vice versa. That is, fitting protrusions are formed on the inner wall of the body 1 and fitting grooves are formed on the outer wall of the cutting blade case 2, so that the cutting blade case 2 is coupled to the body 1.

It should be understood that the body 1 and the cutting blade case 2 can be altered in size, according to the size of selected object. It should be also understood that the spacing between the blade tracks can be formed in a variety of ways upon the object by regulating the step difference of the base plate 22 of the cutting blade case 2, including the cutting blades 22a.

As described above, the present invention provides an apparatus that can shape fruits and root and tuberous vegetables, such as potatoes etc., into a certain shape. The shaping apparatus for fruits and root and tuberous vegetables is operated in such a way that: when a root and tuberous vegetable or fruit (an object) is placed in a cutting blade case and rotated, the object is spirally tracked and the spirally tracked object is removed from the lower side of the cutting blade case, so that the spirally tracked object is picked by an additional stick and then ornamented into the desired form. The shaping apparatus allows fruits and root and tuberous vegetables to be easily treated in a variety of ways, as per the second process, thereby enhancing the product value of the processed foodstuffs produced from the object resulting from the first process.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A shaping apparatus for root and tuberous vegetables and fruits comprising:
   a body shaped as a sleeve form, wherein a plurality of fitting grooves and locking projections are formed at the inner wall of the body and a coil spring is supported by a supporter projection formed at the lower portion of the body and placed in the body;
   a cutting blade case shaped as a cylindrical form, wherein a plurality of fitting protrusions corresponding to the fitting grooves are formed at the outer surface thereof, a through-hole is formed at the center of a base plate inside the cutting blade case, a cutting blade having a step is formed at a half of the base plate and is fitted coupled to the coil spring of the body; and
   an operation cover having a plate body, an operation handle at the upper outer surface of the plate body, and a plurality of locking protrusions at the inside of the periphery of the plate body,
   wherein:
   the operation handle is connected to an operation bar that is formed at the inner surface of the plate body, in which the operation bar has a certain length at the end of which a plurality of fixing protrusions are formed and a fixing pin, shaped as a pin, is extended to a predetermined distance; and
   the plurality of locking protrusions are coupled to the locking projection.

2. The shaping apparatus according to claim 1, wherein the cutting blade case shaped as a cylindrical form for a cutting blade has a step whose width is within 1.5~0.5 mm.

* * * * *